United States Patent Office 3,303,039
Patented Feb. 7, 1967

3,303,039
PROCESS FOR THE CONTINUOUS POLYMERIZA-
TION OR COPOLYMERIZATION OF TRIOXANE
IN THE MOLTEN STATE WITH SOLID ARYL
DIAZONIUM FLUOROBORATE COMPOSITIONS
Edgar Fischer, Frankfurt am Main, and Klaus Kullmar, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Feb. 1, 1963, Ser. No. 255,646
Claims priority, application Germany, Feb. 3, 1962, F 35,929
6 Claims. (Cl. 106—270)

The present invention relates to a process for the continuous polymerization or copolymerization of trioxane in the molten state.

It is known to carry out the continuous polymerization or copolymerization of trioxane in an apparatus, preferably a reactor, which constantly cleans itself and in which the material subjected to the reaction is continuously conveyed.

When the polymerization of trioxane is carried out in this manner the catalyst used is preferably a solid aryldiazonium fluoroboroate for such a catalyst initiates polymerization not spontaneously but after a short period of induction only and then ensures a uniform course of the polymerization, so that the heat of polymerization can be well dissipated.

However, when polymerization aggregates having a low throughput are used, the continuous introduction of dosed quantities of the catalyst is difficult because very small quantities of the catalyst are used. In such cases it has been usual to dilute the catalyst with solid trioxane or polytrioxane, so that it could be added in sufficiently exactly dosed quantities. This solution is, however, not yet quite satisfactory since the addition of dosed quantities of solid substance which per se is difficult has in that case to be carried out with the exclusion of air because the catalyst mixture is sensitive to moisture and oxygen. In practice it is difficult to overcome this difficulty.

It has now been found that in the continuous polymerization or copolymerization of trioxane in the aforesaid apparatus diazonium salts can be added continuously in dosed quantities in a very simple manner with the exclusion of air if the catalyst is finely pulverized and mixed with an inert wax or a paste which under pressure can be conveyed through the tubes as if it were a liquid. In this case the catalyst can continuously be added in dosed quantities by means of dosing devices that are usually applied for dosing liquids, for example, gear pumps or dosing injectors.

The finely pulverized catalyst is suitably mixed with waxes that are insoluble in the molten trioxane and which do not disturb the polymerization of trioxane. As examples of such waxes may be mentioned paraffin waxes or solutions in pure paraffin oil of polyethylene having a molecular weight within the range of 4,000 and 10,000. In the continuous polymerization, for example, if the polymerization is carried out with the use of a co-kneader, the aforesaid substances not only serve to carry the catalyst but in addition thereto act as lubricants.

The consistency of the paste is suitably such that at room temperature the paste can still be pressed through the tubes and at the polymerization temperatures of trioxane (70° to 80° C.) it is not yet so thinly liquid that the mixture of the ground catalyst with the wax or paste separates into its components. This requirement is met, for example, by a paste which forms by cooling a solution of 10 to 30% by weight in paraffin oil of a polyethylene wax having a molecular weight within the range of 4,000 and 10,000, for example, by cooling a solution of 15% strength of polyethylene (molecular weight about 6,000) in paraffin oil according to Deutches Arznei-Buch, 6th edition, the said solutions having been prepared at an elevated temperature.

The quantity of ground catalyst mixed with the paste or wax is such that a continuous addition of sufficiently exactly dosed quantities can be carried out with the dosing devices which are usually applied for the introduction of dosed quantities of liquids. The proportion of catalyst to wax can in general be such that the mixture of the ground catalyst with wax contains 1 to 40% by weight, calculated on the whole mixture, of aryl diazonium fluoroborate. In most cases, however, the quantity of wax is suitably as small as possible, so that the quantities of substances other than the reactants and the catalyst, which are present during the polymerization, are not larger than necessary.

The following example serves to illustrate the invention but it is not intended to limit it thereto.

Example 15 grams of polyethylene wax (molecular weight about 6,000) were dissolved by heating at 120° in 85 grams of paraffin oil (DAB 6). Upon cooling, a white paste having a consistency like that of vaseline formed. This paste was intimately mixed with 10 grams of paranitrophenyl diazonium fluoroborate by grinding in a mortar.

In the continuous polymerization of trioxane in a co-kneader the mixture of the ground catalyst with paranitrophenyl diazonium fluoroborate was directly introduced, in a continuous manner and in dosed quantities, by means of a dosing injector through a tube into the reaction chamber of the kneader. 1 kg. of substances passed through the reactor per hour and 2 grams of catalyst in the form of the paste were introduced per hour.

In order to free the polymer powder which formed from adhering portions of catalyst and unreacted monomer the polymer powder was boiled under reflux with methanol to which a small quantity of ethanol amine had been added, and then dried.

The thermal degradation of the crude polymer thus obtained which took place in 30 minutes at 220° C. under nitrogen, amounted to 3.1% by weight.

The polymer had a reduced viscosity of 0.82 (determined in a solution of 0.5% strength in butyrolactone at 140° C.).

The polymer could be compressed at 190° C. under a pressure of 80 kg./cm.$^2$ to form tough elastic foils.

We claim:

1. A process for continuously polymerizing trioxane in the molten state in the presence of a solid aryl diazonium fluoroborate catalyst which comprises continuously introducing to the trioxane a paste consisting essentially of an intimate admixture of 1 to 40% by weight of said solid catalyst and 99 to 60% by weight of an inert wax selected from the group consisting of a paraffin wax and a polyethylene wax having a molecular weight within the range of 4,000 and 10,000.

2. A process as claimed in claim 1 wherein the inert wax is a paraffin wax.

3. A process as claimed in claim 1 wherein the inert wax is a mixture of polyethylene wax having a molecular weight within the range of 4,000 to 10,000 with a paraffin oil.

4. A process as defined in claim 1 wherein the catalyst is paranitrophenyl diazonium fluoroborate.

5. A process as defined in claim 1 wherein the paste consists essentially of about 10 parts by weight of solid catalyst and about 100 parts by weight of polyethylene having a molecular weight of about 6,000 dissolved in paraffin oil, the proportions by weight of the polyethylene and paraffin oil being about 15:85.

6. Composition of matter consisting of 1 to 40% by weight, calculated on the whole mixture, of solid aryl diazonium fluoroborate and 99 to 60% by weight, calculated on the whole mixture, of a member selected from the group consisting of a paraffin wax and a polyethylene wax having a molecular weight within the range of 4,000 to 10,000.

References Cited by the Examiner

UNITED STATES PATENTS

| | | | |
|---|---|---|---|
| 2,736,667 | 2/1956 | Pabst et al. | 106—270 |
| 2,862,899 | 12/1958 | West | 260—28 |
| 3,018,258 | 1/1962 | Meier et al. | 260—47 |
| 3,063,965 | 11/1962 | Colclough | 260—47 |

FOREIGN PATENTS 1,263,162   4/1961   France.

OTHER REFERENCES

Hackh's Chemical Dictionary, Third Edition, McGraw-Hill Book Company, Inc., New York, p. 906 (1944).

WILLIAM H. SHORT, *Primary Examiner.*

L. M. MILLER, *Assistant Examiner.*